(12) United States Patent
Nitecki

(10) Patent No.: US 6,311,547 B1
(45) Date of Patent: Nov. 6, 2001

(54) SENSOR FOR DETECTING LEAKS IN A LIQUID HYDROCARBON DISPENSER

(75) Inventor: Jean-Pierre Nitecki, Buc (FR)

(73) Assignee: Tokheim Services France, Le Plessis Robinson (FR)

( * ) Notice: Subject to any disclaimer, the term of this patent is extended or adjusted under 35 U.S.C. 154(b) by 0 days.

(21) Appl. No.: 09/355,706

(22) PCT Filed: Dec. 16, 1998

(86) PCT No.: PCT/FR98/02754
§ 371 Date: Nov. 5, 1999
§ 102(e) Date: Nov. 5, 1999

(87) PCT Pub. No.: WO99/31477
PCT Pub. Date: Jun. 24, 1999

(30) Foreign Application Priority Data

Dec. 16, 1997 (FR) .................................................. 97 15972

(51) Int. Cl.[7] .............................. G01M 3/04; G01M 3/16; G01F 23/22
(52) U.S. Cl. .............................. 73/40; 73/40.5 R; 73/49.2; 137/313; 222/51; 222/67; 222/108; 141/86; 141/88; 141/311 A
(58) Field of Search .................. 73/40.52, 40, 49.2; 137/312, 313; 141/86, 88, 311 A; 222/51, 64, 67, 108

(56) References Cited

U.S. PATENT DOCUMENTS

| | | |
|---|---|---|
| 3,955,822 | 5/1976 | Irby . |
| 4,030,708 | 6/1977 | Stock et al. . |
| 4,682,492 | 7/1987 | Green ................................... 73/49.2 |
| 4,842,163 * | 6/1989 | Bravo ............................... 222/108 X |
| 5,099,894 * | 3/1992 | Mozeley, Jr. ........................... 141/86 |
| 5,301,722 | 4/1994 | Todd et al. ............................. 141/86 |
| 5,339,676 | 8/1994 | Johnson . |
| 5,501,577 | 3/1996 | Cornell et al. . |
| 5,550,532 * | 8/1996 | Marshall .......................... 137/312 X |
| 5,583,283 | 12/1996 | Hampton et al. . |

FOREIGN PATENT DOCUMENTS

| | | |
|---|---|---|
| 35 38 604 | 5/1987 | (DE) . |
| 2161501 | 1/1986 | (GB) . |

OTHER PUBLICATIONS

Patent Abstracts of Japan, vol. 008, No. 072 (P–265),Apr. 4, 1984 & JP 58 219430 A (Hitachi Seisakusho KK, Dec. 20, 1983.
Patent Abstracts of Japan vol. 013, No. 102 (P–841), Mar. 10, 1989 & JP 63 282626 A (Toshiba Corp; Nov. 18, 1988.
Patent Abstracts of Japan vol. 008, No. 175 (P–294), Apr. 11, 1984 & JP 59 068640 A (Mitsubishi Jukogyo KK), Apr. 18, 1984.
Patent Abstracts of Japan vol. 097, No. 009, Sep. 30, 1997 & JP 09 117091 A (Toshiba Corp), May 2, 1997.

* cited by examiner

*Primary Examiner*—Daniel S. Larkin
(74) *Attorney, Agent, or Firm*—Drinker Biddle & Reath LLP

(57) ABSTRACT

The invention concerns a sensor for detecting leaks in a liquid hydrocarbon dispenser, said sensor comprising a sealed plate arranged at the dispenser base and provided with a collecting container for receiving said liquid hydrocarbons collected by said sealed plate and coming from leaks in the dispenser, said collecting container comprising a sensor at the level of said hydrocarbons, capable of stopping the operation of the dispenser when the hydrocarbon level sensed reaches a predetermined level (N). The invention is useful for protecting the environment against hydrocarbon pollution.

6 Claims, 3 Drawing Sheets

SENSOR FOR DETECTING LEAKS IN A LIQUID HYDROCARBON DISPENSER

FIELD OF INVENTION

The present invention relates to a sensor for detecting leaks in a dispenser for liquid hydrocarbons.

The invention can be applied to particular advantage in the field of environmental protection against hydrocarbons, especially fuels for motor vehicles.

BACKGROUND OF THE INVENTION

In view of growing concerns to preserve the quality of the environment, it appears essential to fit liquid hydrocarbon dispensers with a sensor for detecting leaks, regardless of where they originate within the dispenser.

Several detection systems have been proposed for this purpose.

Firstly, it is possible to detect the vapours from liquid hydrocarbons inside the dispenser. This can be achieved either by means of biological, optical or combined sensors or by measuring the density of vapours contained in the dispenser. However, in view of the very marked variety of temperatures, humidity and quality of installation at service stations, this type of detection triggers numerous false alarms or, even worse, no alarm at all. Biological sensors, furthermore, have a tendency to become poisoned by additives. When it comes to liquid hydrocarbons of the gas oil type, these generate no or little vapour and it is difficult to detect their presence other than by the odours of the additives which they contain.

It would be conceivable to detect leaks by taking pressure measurements at different points in the pipework system for the hydrocarbons. However, to detect slight leaks, it is necessary to have a perfect knowledge and model of the distribution of pressure in the passages depending on the conditions under which the dispensers are installed on site and the sensors need to be extremely sensitive, in order of several mbars, and be capable of withstanding pressure surges of more than 15 bars, which require extremely expensive equipment. Moreover, the software must exhibit a high degree of intelligence to be able to process data from the sensors. Finally, sensors operating in hazardous areas also need to be security-protected and are therefore very expensive.

SUMMARY OF THE INVENTION

Accordingly, the technical problem to be resolved for the purposes of the invention is that of proposing a sensor for detecting leaks in a liquid hydrocarbon dispenser that would be simple in design and cost-effective whilst providing perfect efficiency and the requisite security.

This technical problem is resolved for the purposes of the invention due to the fact that said sensor comprises a sealed plate, arranged on the base of said dispenser and fitted with a catchment container designed to receive the liquid hydrocarbons collected by said sealed plate and coming from leaks in the dispenser, said catchment container having a level detector for said hydrocarbons, capable of halting operation of the dispenser if the detected level of hydrocarbons reaches a given level.

This provides a perfectly reliable sensor due to the presence of the sealed plate in the base of the dispenser where liquid hydrocarbons emanating from all leaks, regardless of their origin, are collected and detected. Furthermore, the sensor proposed by the invention uses components (plate, catchment container and level detector) which are cheap and easy to install in the dispensers.

By virtue of another advantageous feature of the leakage sensor proposed by the invention, said dispenser has a pump, a flow-rate counter and a computer, said computer being capable of detecting a flow rate of liquid hydrocarbons in said counter after the dispensing process because said pump continues to operate for a given period.

As a complement to overall detection of leaks inside the dispenser, this particular feature pinpoints any leaks which might occur downstream of the flow-rate counter. In practice, after dispensing, immediately after the gun is replaced, rather than halting the motor of the pump in the dispenser as usually happens, operation of said motor is continued for a period in the order of a few seconds during which the computer continues to monitor the data from the counter so that if a flow rate is detected by the computer, it can only be attributable to a leakage downstream of the counter, and an indication of this fault can then be given to the service station manager, pinpointing where the dispenser is faulty. This detection system is particularly useful in the case of dispensers fitted with double hose vapour recovery devices as a means of detecting any leaks of liquid hydrocarbons which might be sucked in by the recovery device.

The description outlined below with reference to the appended drawings, given by way of illustration and not restrictive in any respect, should provide an understanding of what the invention comprises and how it can be operated.

DETAILED DESCRIPTION OF THE INVENTION

Figure 1:
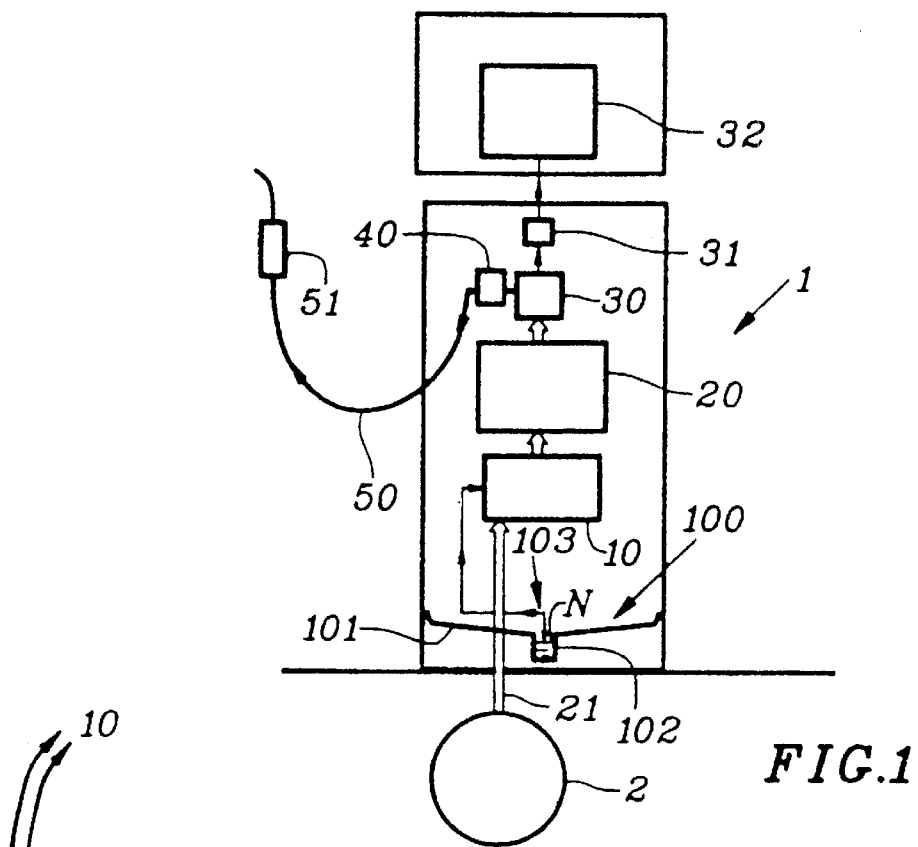
FIG. 1 is a side view of a liquid hydrocarbon dispenser fitted with a leakage sensor as proposed by the invention.

FIG. 1 illustrates a dispenser 1 for liquid hydrocarbons having a pump 10 which extracts said hydrocarbons from a storage tank 2 and conveys them into a gas-release device 20, the purpose thereof being to remove the gases incorporated in the liquid, which is then fed to a flow-rate counter 30, generally capable of producing a movement in rotation, the angular speed of which is proportional to the hydrocarbon flow-rate. A transducer 31 of the wheel encoder type enables the mechanical position of the counter to be converted into electric pulses. Said pulses are transmitted to a computer 32 in order to establish the volume of hydrocarbons dispensed and the amount payable on the basis of the unit price.

Having passed through the flow-rate counter 30, the liquid is conveyed through a member 40 providing a connection to a flexible hose 50 terminating in a dispenser gun 51.

As may be seen from FIG. 1, the dispenser 1 has a leakage sensor 100 essentially comprising a sealed plate 101 arranged on the base of the dispenser 1 and a catchment container 102 designed to receive the liquid hydrocarbons collected by the plate 101 and coming from leaks in the dispenser. In the embodiment illustrated in FIG. 1, the catchment container 102 is positioned substantially at the centre of the plate 101, this latter being of a flared design to facilitate the flow of hydrocarbons collected to the catchment container 102.

As illustrated in FIG. 1, the catchment container 102 has a level detector 103 capable of halting operation of the dispenser 1 if the detected level of hydrocarbons reaches a given level N. In the example given in FIG. 1, the level sensor 103 is connected to the motor of pump 10 of the dispenser, If the given level is reached, the detector 103 sends a signal commanding that operation of the motor of the pump 10 be halted.

Figure 2:
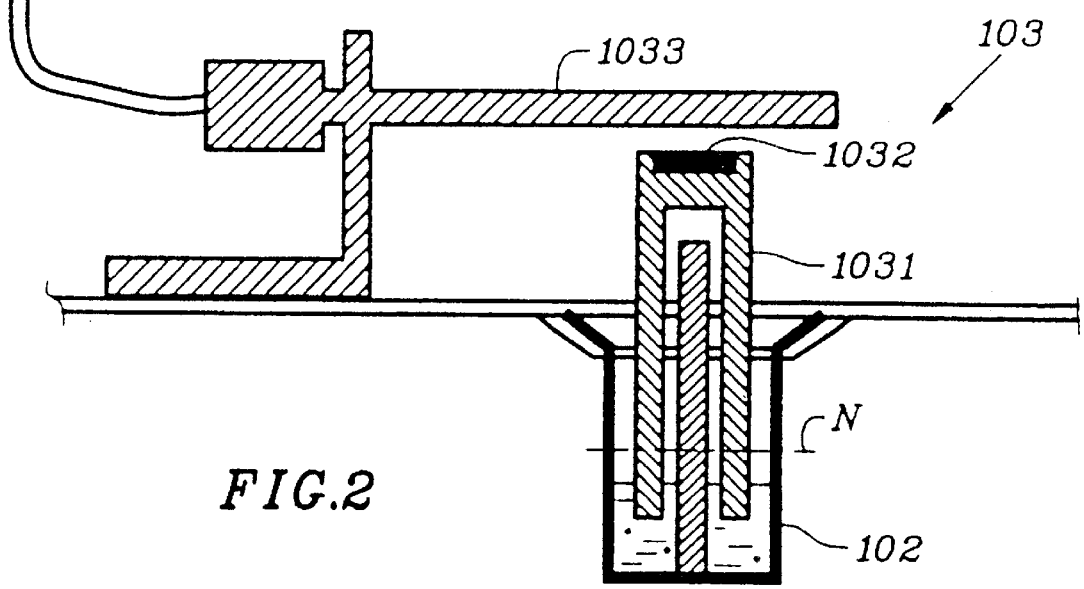
FIG. 2 is a side view of a level detector of the leakage sensor of FIG. 1.

FIG. 2 illustrates a specific embodiment of the level detector 103 in which a float 1031 is placed in the catchment container 102. The position of said float 1031 is detected by a position sensor comprising a magnet 1032 disposed at the non-immersed end of the float 1031 and an element 1033 sensitive to the magnetic field, such as a Reed relay or a Hall effect sensor, and connected to the pump 10. As the catchment container 102 fills up, the level of the float 1031 rises and the magnetic field detected by the sensitive element 1033 increases until it reaches a high enough value to actuate said sensitive element and trigger the shutdown of the motor of the pump 10. The level N at which the leakage sensor 103 is triggered is calibrated so as to correspond to a given volume of leakage, for example less than 100 cm$^3$.

Figure 3:
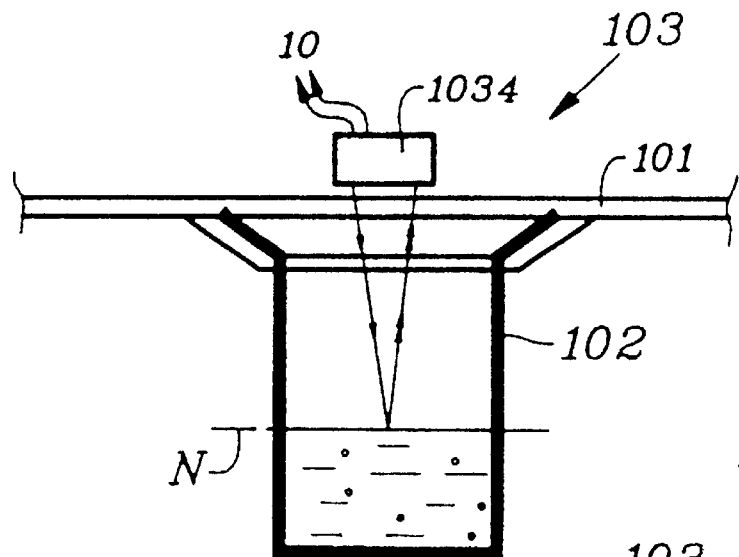
FIG. 3 is a side view of a first variant of the embodiment of the level detector illustrated in FIG. 2.

FIG. 3 illustrates an embodiment of the level detector 103 comprising a piezoelectric transducer 1034 designed to emit an ultrasound wave and detect the echo reflected from the surface of the liquid hydrocarbons in the catchment container 102. The time which elapses between emission of the ultrasound wave and detection of the echo is directly proportional to the position of the liquid level in the container 102.

Figure 4:
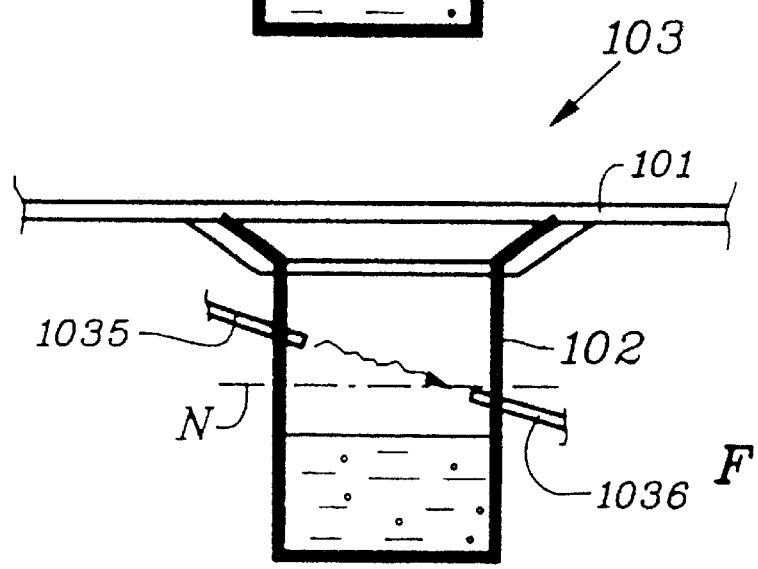
FIG. 4 is a side view of a second variant of the embodiment of the level detector illustrated in FIG. 2.

Another embodiment is illustrated in FIG. 4. This is an optical level detector comprising an optical fibre 1035 which emits a light wave and a receiving optical fibre 1036, positioned in alignment on either side of the catchment container 102. If the level of liquid hydrocarbons has reached the level N of FIG. 4, the light wave is deflected by reflection and refraction and the receiving optical fibre 1036 no longer receives light radiation and this situation is detected by an optical sensor, not illustrated, located at the end of the optical fibre 1036, which sends a signal to shut down the pump 10.

In view of the fact that water may accidentally get into the catchment container 102, means must be provided to overcome this problem, which is likely to distort operation of the leakage sensor proposed by the invention.

A first approach is to make the catchment container 102 so that it can be moved, enabling the service station manager to purge said recipient of any water each time the dispenser 1 is inspected.

Figure 5:
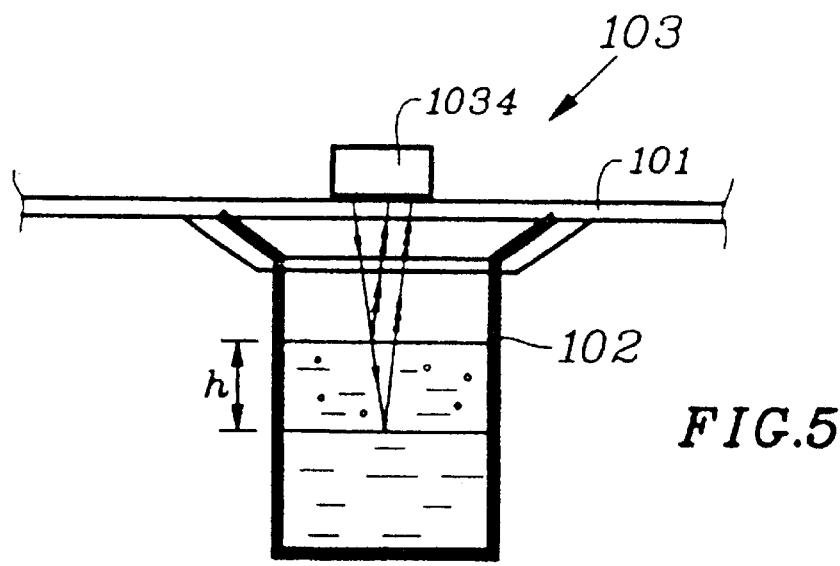
FIG. 5 is a side view of a level detector fitted with a water-level detector.

In the case of service stations unattended by personnel, the level detector illustrated in FIG. 5 may be used. This latter detector uses a piezoelectric transducer 1034, identical to that of FIG. 3, designed to detect the echoes of the ultrasound wave produced on the one hand at the air/hydrocarbon interface and on the other hand at the hydrocarbon/water interface. The time separating these two echoes is directly proportional to the height h of hydrocarbons.

Figure 6:
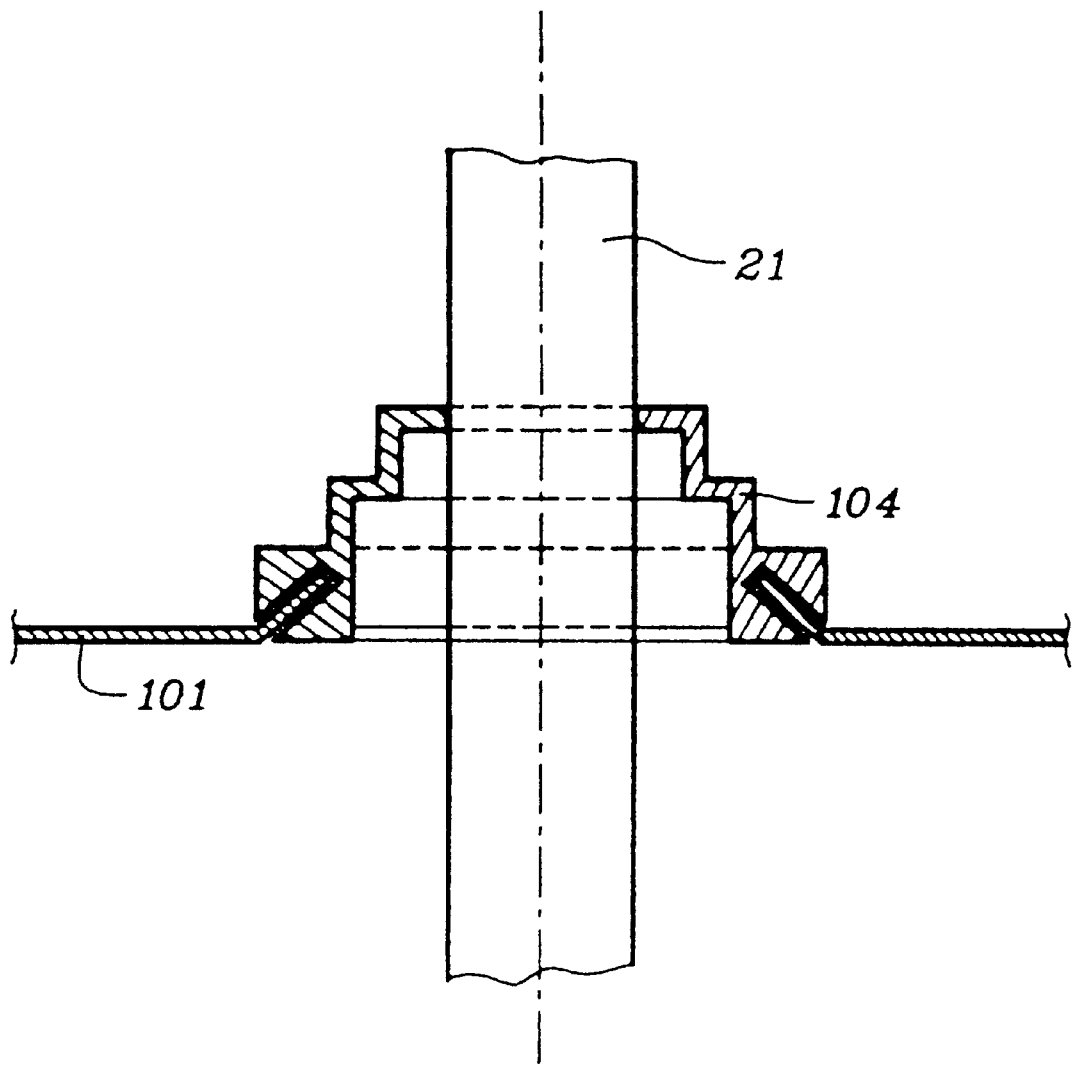
FIG. 6 is a side view of a pipe passage through the sealed plate of FIG. 1.

Clearly, in view of its position in the dispenser 1, the plate 101 has passages through it, such as that shown by reference 21 in FIG. 1, coming from the storage tank 2. In order to ensure that the leakage sensor proposed by the invention is sealed, the passage of any pipes running through the plate 101 must be sealed in turn and this can be effected by means of a flexible bellow expansion joint 104 such as that illustrated in FIG. 6.

The computer 32 may be provided with software which, instead of halting the pump 10 when the gun 51 is replaced, i.e. at the end of the dispensing operation, prolongs operation of said pump for a given period, a few seconds. In this manner, if there are any leaks of liquid hydrocarbon downstream of the counter 30, a flow rate will be detected by the computer 32 and the anomaly will be indicated to the service station manager. As already mentioned above, this option of detecting leaks downstream of the flow-rate counter 30 has the advantage of highlighting induction of liquid hydrocarbons by the vapour recovery devices fitted to the dispensers.

What is claimed is:

1. A leakage sensor in a dispenser for liquid hydrocarbons comprising a sealed plate arranged in a base of said dispenser and fitted with a catchment container adapted to receive and collect liquid hydrocarbons from hydrocarbon liquid leaks in said dispenser, said catchment container having a level detector for said hydrocarbons, capable of halting operation of the dispenser if the detected level of hydrocarbons reaches a selected level.

2. A sensor in a dispenser according to claim 1 wherein said level detector comprises a float fitted with a position sensor.

3. A sensor in a dispenser according to claim 1 wherein the dispenser contains a pump, a flow-rate counter, and a computer, said computer being set up to detect a liquid hydrocarbon flow-rate in said counter after dispensing hydrocarbon liquid.

4. A hydrocarbon liquid dispenser comprising:
a base,
a pump for pumping hydrocarbon liquid from a storage tank, and
a leakage sensor for detecting leakage of hydrocarbons in said dispenser comprising a sealed plate arranged in the base of said dispenser and fitted with a catchment container adapted to receive and collect liquid hydrocarbons, said catchment container having a level detector for said hydrocarbons capable of halting operation of the dispenser if the detected level of hydrocarbons reaches a selected level.

5. A dispenser according to claim 4 wherein said level detector comprises a float fitted with a position sensor.

6. A dispenser according to claim 4 further comprising a flow-rate counter and a computer, said computer being set up to detect a liquid hydrocarbon flow-rate in said counter after dispensing hydrocarbon liquid.

* * * * *